United States Patent
Oh et al.

(10) Patent No.: US 9,030,417 B2
(45) Date of Patent: May 12, 2015

(54) METHOD AND APPARATUS FOR PREVENTING INCORRECT INPUT IN PORTABLE TERMINAL

(75) Inventors: Joon-Seop Oh, Suwon-si (KR); Young-Hee Park, Seoul (KR); Jung-Yun Seo, Seoul (KR); Hark-Soo Kim, Chuncheon-si (KR); Yeong-Kil Song, Chuncheon-si (KR)

(73) Assignees: Samsung Electronics Co., Ltd., Suwon-Si (KR); Industry-University Cooperation Foundation Sogang University, Seoul (KR)

( * ) Notice: Subject to any disclaimer, the term of this patent is extended or adjusted under 35 U.S.C. 154(b) by 388 days.

(21) Appl. No.: 13/415,718

(22) Filed: Mar. 8, 2012

(65) Prior Publication Data

US 2012/0229388 A1  Sep. 13, 2012

(30) Foreign Application Priority Data

Mar. 8, 2011 (KR) .................. 10-2011-0020283

(51) Int. Cl.
*G06F 3/02* (2006.01)
*G06F 3/01* (2006.01)
*G06F 3/023* (2006.01)
*G06F 3/0489* (2013.01)

(52) U.S. Cl.
CPC .............. *G06F 3/018* (2013.01); *G06F 3/0236* (2013.01); *G06F 3/0237* (2013.01); *G06F 3/04895* (2013.01)

(58) Field of Classification Search
CPC .................................................. G06F 3/0237
See application file for complete search history.

(56) References Cited

U.S. PATENT DOCUMENTS

| | | | |
|---|---|---|---|
| 6,556,841 B2 | 4/2003 | Yu | |
| 7,277,088 B2 | 10/2007 | Robinson et al. | |
| 7,865,824 B1* | 1/2011 | Hayati | 715/254 |
| 8,232,973 B2* | 7/2012 | Kocienda et al. | 345/173 |
| 2003/0011574 A1* | 1/2003 | Goodman | 345/172 |
| 2008/0167858 A1* | 7/2008 | Christie et al. | 704/10 |
| 2011/0202876 A1* | 8/2011 | Badger et al. | 715/816 |
| 2013/0006613 A1* | 1/2013 | Karov Zangvil et al. | 704/9 |

FOREIGN PATENT DOCUMENTS

KR  10-2010-0042998  4/2010

* cited by examiner

*Primary Examiner* — Latanya Bibbins (57) ABSTRACT

According to certain embodiments, a method and apparatus for preventing incorrect input in a portable terminal includes identifying an input character string and, among previously registered candidate words, searching among a plurality of candidate words recommended for the input character string, calculating a similarity between the input character string and each of the searched candidate words, and presenting one or more of the searched candidate words in order of descending similarity associated with the one or more searched candidate words.

24 Claims, 11 Drawing Sheets

| INCORRECT INPUT TYPE | EXAMPLE | KEYPAD TYPE OF HIGH FREQUENCY OF OCCURRENCE OF CORRESPONDING INCORRECT INPUT |
|---|---|---|
| CONTINUOUS KEY PRESSING | 등잔산 -> 등잔ㅅ산 | COMBINATION |
| ADJACENT KEY PRESSING | 삼일전력공사 -> 삼일전렬공사 | QWERTY, COMBINATION, POP-UP |
| KEY OMISSION | 효성기업사 -> 효성기엄사 | COMBINATION |
| KEY INPUT ORDER | 장흥원유치원 -> 장흥원유치워ㆍㄴ | QWERTY, COMBINATION, POP-UP |

FIG.3

< QWERTY KEYPAD >

| 키 | MAPPING CHARACTER |
|---|---|
| ㅂ | Q |
| ㅈ | W |
| ㄷ | E |
| ㄱ | R |
| ㅅ | T |
| ㅛ | Y |
| ㅕ | U |
| ㅏ | I |
| ㅐ | O |
| ㅔ | P |
| ... | ... |

< COMBINATION KEYPAD >

| KEY | MAPPING CHARACTER |
|---|---|
| ㅣ $_1$ | 1 |
| · $_2$ | 2 |
| ㅡ $_3$ | 3 |
| ㄱ ㅋ $_4$ | 4 |
| ㄴ ㄹ $_5$ | 5 |
| ㄷ ㅌ $_6$ | 6 |
| ㅂ ㅍ $_7$ | 7 |
| ㅅ ㅎ $_8$ | 8 |
| ㅈ ㅊ $_9$ | 9 |
| ㅇ ㅁ $_0$ | 0 |
| ... | ... |

FIG.4

< EDIT DISTANCE >

$$EDIT(i, j) = \min \begin{bmatrix} EDIT(i-1, j) + INSERT(s_{i-1}, s_i, t_i) \\ EDIT(i, j-1) + DELETE(s_i, t_i, t_{i+1}) \\ EDIT(i-1, j-1) + REPLACE(s_i, s_{i+1}, t_j, t_{j+1}) \end{bmatrix}$$

FIG.5

| TYPE | | CONDITION | COST (VALUE) APPLIED TO EACH OPERATIN AT TIME OF EDIT DISTANCE CALCULATION | | |
|---|---|---|---|---|---|
| | | | QWERTY | COMBINATION | POP-UP |
| INSERT(si-1, si, tj) | CONTINUOUS KEY PRESSING | IF si-1 ==si & si ==tj | 3 | 1 | 3 |
| | | OTHERWISE | | 3 | |
| DELETE(si, tj, tj+1) | KEY OMISSION | IF si-1 ==tj+i & si ==tj | 3 | 1 | 3 |
| | | OTHERWISE | | 3 | |
| REPLACE(si, si+1, tj, tj+1) | KEY INPUT ORDER | IF si ==tj | | 0 | |
| | | IF sisi+1 ==tj+1 tj | | 1 | |
| | ADJACENT KEY PRESSING | IF NEAR(si, tj) | KEY BEING ADJACENT AND HAVING HIGH POSSIBILITY OF INCORRECT INPUT = 1 KEY BEING ADJACENT BUT HAVING LOW POSSIBILITY OF INCORRECT INPUT = 2 | | |
| | | OTHERWISE | | 3 | |

FIG.6

<EDIT DISTANCE IN COMBINATION KEYPAD>

| INPUT CHARACTER STRING | CANDIDATE CHARACTER STRING | | |
|---|---|---|---|
| | 감기 ⇨ 4120041 | 감기 ⇨ 412041 | 감기 ⇨ 4120041 |
| | 4 1 2 0 0 4 1 | 4 1 2 0 4 1 | 4 2 1 0 0 4 1 |
| 4 | | | |
| 4 | | | |
| 1 | | | |
| 2 | | | |
| 0 | | | |
| 0 | | | |
| 4 | | | |
| 1 | A | B | C |

감During ⇨ 44120041

FIG.7

< QWERTY KEYPAD >

FIG.8

< QWERTY KEYPAD >

| LETTER | | ㅇ/ㅁ | ㅣ | · | ㅡ | ㄱ/ㅋ | ㄴ/ㄹ | ㄷ/ㅌ | ㅂ/ㅍ | ㅅ/ㅎ | ㅈ/ㅊ | [] |
|---|---|---|---|---|---|---|---|---|---|---|---|---|
| | CODE | 0 | 1 | 2 | 3 | 4 | 5 | 6 | 7 | 8 | 9 | a |
| ㅇ/ㅁ | 0 | 0 | 3 | 3 | 3 | 3 | 3 | 3 | 3 | 3 | 3 | 3 |
| ㅣ | 1 | 3 | 0 | 1 | 3 | 1 | 1 | 3 | 3 | 3 | 3 | 3 |
| · | 2 | 3 | 1 | 0 | 1 | 3 | 1 | 3 | 3 | 3 | 3 | 3 |
| ㅡ | 3 | 3 | 3 | 1 | 0 | 3 | 3 | 1 | 3 | 3 | 3 | 3 |
| ㄱ/ㅋ | 4 | 3 | 1 | 3 | 3 | 0 | 1 | 3 | 3 | 3 | 3 | 3 |
| ㄴ/ㄹ | 5 | 3 | 3 | 3 | 3 | 1 | 0 | 1 | 3 | 3 | 3 | 3 |
| ㄷ/ㅌ | 6 | 3 | 3 | 3 | 1 | 3 | 1 | 0 | 3 | 3 | 1 | 3 |
| ㅂ/ㅍ | 7 | 3 | 3 | 3 | 3 | 1 | 3 | 3 | 0 | 1 | 3 | 3 |
| ㅅ/ㅎ | 8 | 3 | 3 | 3 | 3 | 3 | 1 | 3 | 1 | 0 | 1 | 3 |
| ㅈ/ㅊ | 9 | 3 | 3 | 3 | 3 | 3 | 3 | 1 | 3 | 1 | 0 | 3 |
| [] | a | 3 | 3 | 3 | 3 | 3 | 3 | 3 | 3 | 3 | 3 | 0 |

FIG.9

< POU-UP KEYPAD >

| LETTER | | ─ | · | ǀ | ⊥ | ⊤ | ⊣ | ⊦ |
|---|---|---|---|---|---|---|---|---|
| | CODE | n | m | j | 8 | 2 | 4 | 6 |
| ─ | n | 0 | 2 | 2 | 1 | 1 | 1 | 1 |
| · | m | 2 | 0 | 2 | 1 | 1 | 1 | 1 |
| ǀ | j | 2 | 2 | 0 | 1 | 1 | 1 | 1 |
| ⊥ | 8 | 1 | 1 | 1 | 0 | 3 | 3 | 3 |
| ⊤ | 2 | 1 | 1 | 1 | 3 | 0 | 3 | 3 |
| ⊣ | 4 | 1 | 1 | 1 | 3 | 3 | 0 | 3 |
| ⊦ | 6 | 1 | 1 | 1 | 3 | 3 | 3 | 0 |

METHOD AND APPARATUS FOR PREVENTING INCORRECT INPUT IN PORTABLE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Mar. 8, 2011 and assigned Serial No. 10-2011-0020283, the contents of which are herein incorporated by reference.

TECHNICAL FIELD OF THE INVENTION

The present invention relates to interface devices, and more particularly, to a method and apparatus for preventing incorrect input in a portable terminal.

BACKGROUND OF THE INVENTION

Due to the development of electronic communication industries, portable terminals such as mobile communication terminals (i.e., cellular phones), electronic pocketbooks, Personal Digital Assistants (PDAs) and the like have become widely used in modern society while becoming a significant means for delivery of information changing quickly.

Generally, the portable terminal has a keypad that provides a means of inputting information. Additionally, portable terminals have been miniaturized to the point that they may be difficult to be configured with these keypads. Although keypads may be provided in the relatively restricted space provided by the miniaturized portable terminals, and unintentional consequence is produced in which incorrect input occurs because a key size of the keypad is small or a key interval of the keypad is dense. After all, a user is often generally cognizant of the necessity of being cautious to not input incorrect information through the keypad. This causes a burden on the user. Generally, to solve this problem, a technique for presenting words similar with an incorrect input word has been proposed. This existing technique includes comparing an input character string with a previously registered correct character string. This technique, however, has a disadvantage that it is dependent on a particular form of character. Further, because incorrect input circumstances may be different according to the type of keypad, the manner for presenting a similar word may be difficult to accomplish when multiple similarly spelled words are used. For one example, a combination keypad is of a scheme in which two or more letters are allocated to one key and, whenever a key is pressed, a letter is changed and input. Compared to the known Qwerty keypad, the combination keypad has fewer keys in number so that the combination keypad may suffer incorrect input more frequently following the number of times of key pressing than incorrect input of an adjacent key.

SUMMARY OF THE INVENTION

To address the above-discussed deficiencies of the prior art, it is a primary object to provide some, none, or all of the advantages described below. Accordingly, one aspect of the present invention is to provide a method and apparatus for making user's input convenient in a portable terminal.

Another aspect of the present invention is to provide a method and apparatus for reducing incorrect input in a portable terminal.

A further aspect of the present invention is to provide a method and apparatus for presenting a word similar with an incorrect input word according to the type of incorrect input by a keypad in a portable terminal.

The above aspects are achieved by providing a method and apparatus for preventing incorrect input in a portable terminal.

According to one aspect of the present invention, a method for preventing incorrect input in a portable terminal includes identifying an input character string and, among previously registered candidate words, searching candidate words recommended for the input character string, calculating a similarity between the input character string and each of the searched candidate words, and presenting the searched candidate words according to an order of descending similarity.

According to another aspect of the present invention, an apparatus for preventing incorrect input in a portable terminal includes an input unit configured to input information from a user, an output unit configured to output voice or video content, a storage unit configured to store data, a communication unit configured to communicate externally from the portable terminal, and a controller configured to, after identifying an input character string, search candidate words recommended for the input character string among previously registered candidate words, calculate a similarity between the input character string and each of the searched candidate words, and present the searched candidate words according to an order of descending similarity.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8, 9, and 10 illustrate example charts of presenting a cost applied to a replace operation for incorrect input following adjacent key pressing by each keypad type according to an embodiment of the present invention.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminals. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Various embodiments of the present invention relate to a method and apparatus for preventing incorrect input in a portable terminal. More particularly, the exemplary embodiments of the present invention relate to a method and apparatus for presenting a similar word considering the type of incorrect input by keypad.

Figure 1:
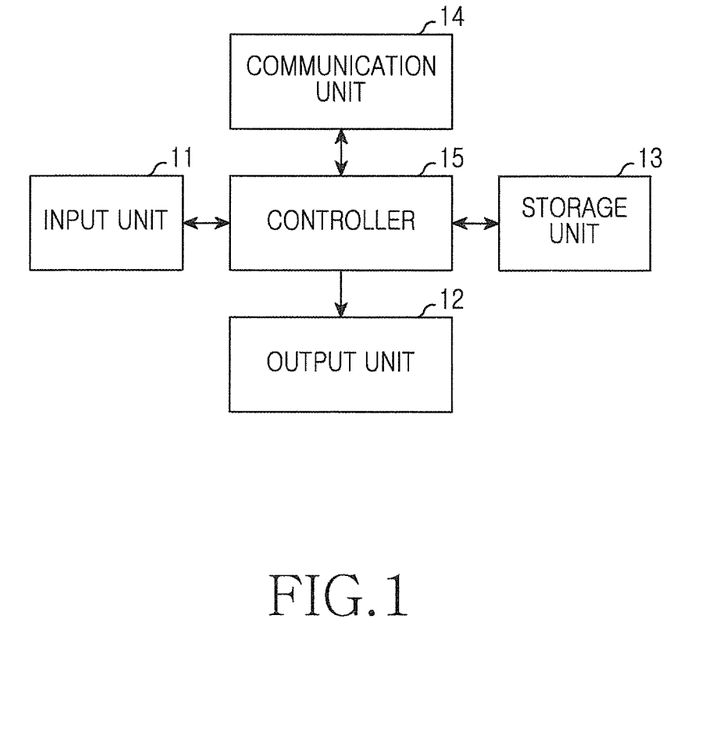
FIG. 1 illustrates an example portable terminal according to an embodiment of the present invention.

FIG. 1 illustrates an example portable terminal according to an embodiment of the present invention.

Referring to FIG. 1, the portable terminal includes an input unit 11 for input, an output unit 12 for voice or image output, a storage unit 13 for storing data, a communication unit 14 for communication, and a controller 15 controlling general operation of the portable terminal.

The input unit 11 outputs an input signal to the controller 15. According to the control of the controller 15, the output unit 12 receives an input of voice or display data corresponding to the input signal. The input unit 11 and the output unit 12 may be formed in a single entity. A touch sensitive display (touch screen) may be used for inputting and outputting for dealing with non-sound inputs and outputs. The storage unit 12 stores computer executable instructions that may be in the form of a program for controlling general operation, and controlling various data input/output when control operation is performed. The method of the present invention described hereunder may be stored as instructions in one or more software modules. The modules may be stored in the storage unit 13. The storage unit 13 may be called as a memory.

The controller 15 controls the general operation of the terminal. A method in which the controller 15 presents a similar word considering the type of incorrect input by keypad according to an embodiment of the present invention is described below with reference to the accompanying drawings.

Figure 2:
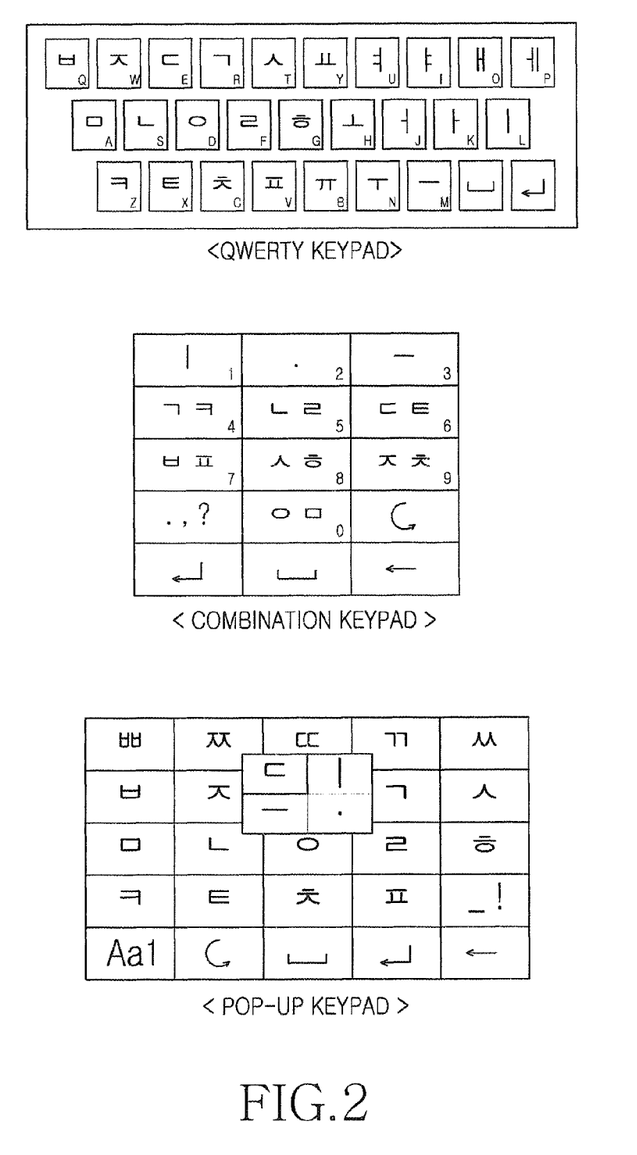
FIG. 2 illustrates an example keypad according to an embodiment of the present invention.

FIG. 2 illustrates the type of a keypad according to an embodiment of the present invention.

Referring to FIG. 2, the particular keypad types shown includes a Qwerty keypad, a combination keypad, a pop-up keypad, respectively. Other types of keypads may be implemented according to the teachings of the present invention. For example, a touch screen terminal may provide one or more modifiable input screens such that it may realize all of the shown keypads. The Qwerty keypad, in many cases, may be similar to a keyboard arrangement of a Personal Computer (PC) Each key of the Qwerty keypad may provide input of several keys because one character (or letter) is mapped to one key. Therefore, the Qwerty keypad may frequently suffer incorrect input due to unintentional pressing of an adjacent key. Further, the combination keypad has an arrangement in which two or more characters are allocated to one key and, whenever a key is pressed, a character is changed and input. Compared to the Qwerty keypad, the combination keypad has fewer keys in number, such that the combination keypad may frequently suffer incorrect input due to the number of times the keys are pressed rather than incorrect input following adjacent key pressing. Further, the pop-up keypad is of a arrangement such that, when a key associated with a letter is pressed, presenting a window for selecting using a drag or touch action, keys defining letters combinable with the letter defining the selected key. The pop-up keypad is often apt to cause incorrect input because an adjacent key is pressed.

Figure 3:
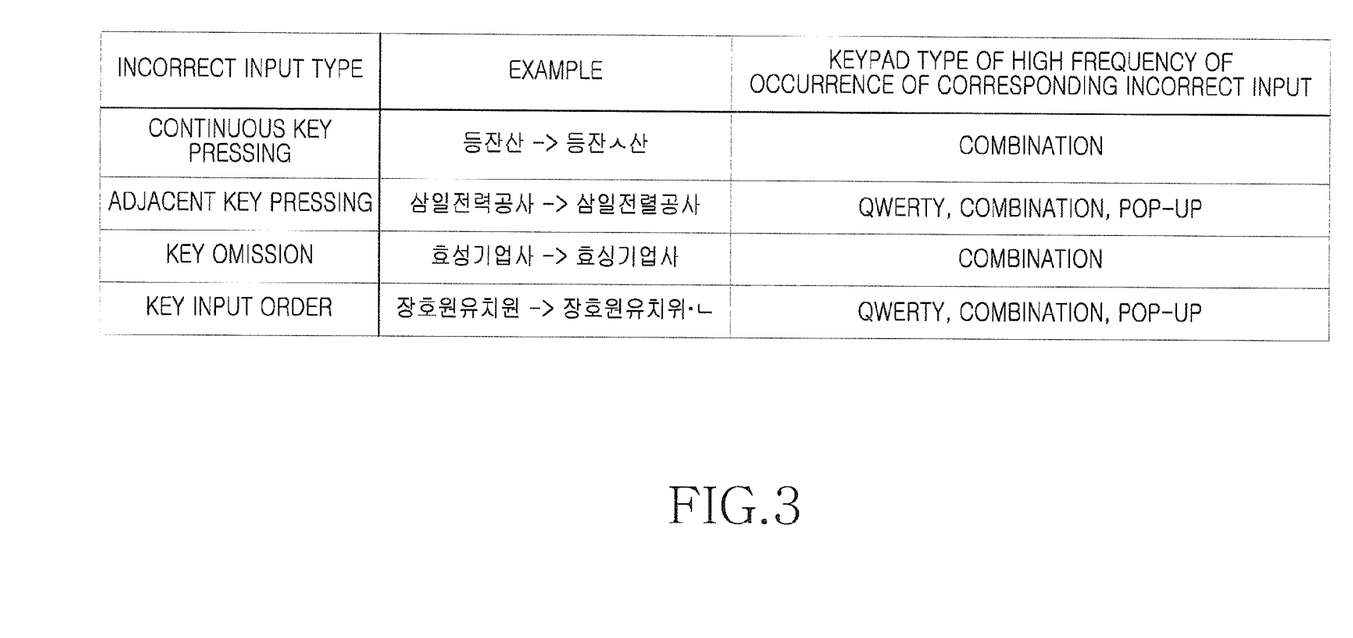
FIG. 3 illustrates an example chart depicting several types of incorrect input according to an embodiment of the present invention.

FIG. 3 illustrates several types of incorrect input according to an embodiment of the present invention.

Referring to FIG. 3, the incorrect input type can include incorrect input due to the number of times of corresponding key pressing, incorrect input due to adjacent key pressing, incorrect input due to key pressing omission, and incorrect input due to a change of key input order. A combination keypad frequently suffers incorrect input due to continuous key pressing and incorrect input due to key omission. Further, all keypad types (e.g., a Qwerty keypad, a combination keypad, and a pop-up keypad) may suffer incorrect input due to adjacent key pressing and the incorrect input due to incorrect key input order. That is, the likelihood of incorrect input may be due to the keypad type. Thus, certain embodiments of the present invention determines similarities between an input character string and candidate words considering incorrect input by keypad type, and presents candidate words of relatively high similarities to a user of the keypad.

Figure 4:
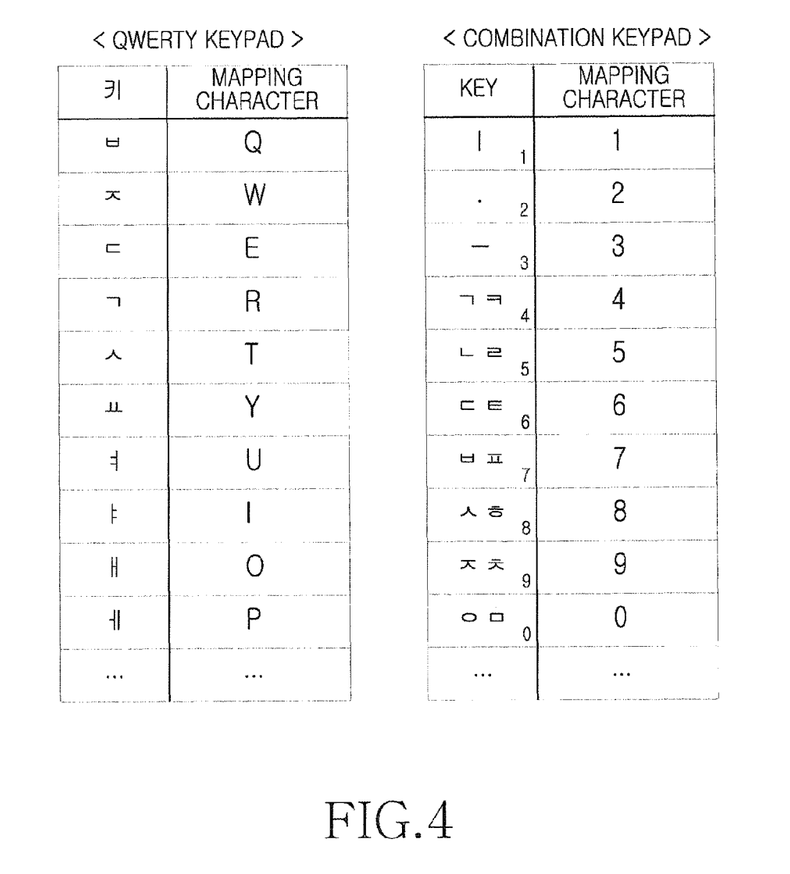
FIG. 4 illustrates an example chart illustrating several codes that are mapped to each key by keypad type that may be used to draw a key input string according to an embodiment of the present invention.

FIG. 4 illustrates an example code mapped to each key by keypad type to draw a key input string according to an embodiment of the present invention. Referring to FIG. 4, a particular Qwerty keypad maps each of keys allocated Hangeul letters, to an English alphabet code. For example, a character string '감기' may be converted into a key input string 'RKARL'. Also, a combination keypad maps each of keys allocated Hangeul letters, to a numeral code. For one example, the character string '감기' may be converted into a key input string '4120041'. That is, the key input string (or code sequence) presents the order of pressing real keys to input a corresponding character string in order. Also, the key input string presents positions on a keyboard of real keys to input a corresponding character string. Accordingly, from the comparison between a key input string of a character string corresponding to incorrect input and a key input string of a character string corresponding to correct input, it can be identified what type the incorrect input is. For example, if seeing a character string itself only from a correct input character string '감기' and an incorrect input character string '감기', it may have an input of 'ㅋ' in place of 'ㄱ'. However, the combination keypad has an expression of a key input string '4120041' for the character string '감기' and has an expression of a key input string '44120041' for the character string '감기', so it can be appreciated that it is incorrect input following continuous key ('ㄱ'/'ㅋ') pressing.

Figure 5:
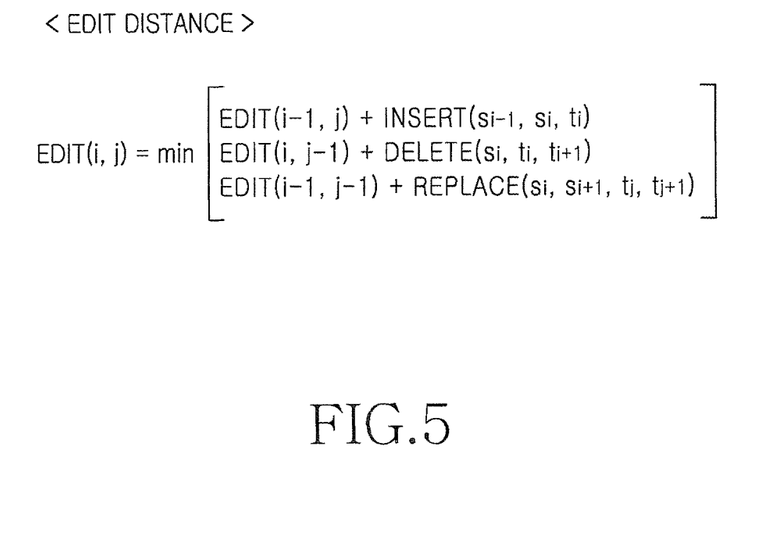
FIG. 5 illustrates an example algorithm for determining a similarity between an input character string and each candidate word according to an embodiment of the present invention.

FIG. 5 illustrates an example algorithm for determining a similarity between an input character string and each candidate word according to an embodiment of the present invention. Referring to FIG. 5, the algorithm obtains the minimum number of times that the original character string is changed to a desired character string, that is, an edit distance. The algorithm for obtaining the edit distance is the known as the Levenshtein distance. Generally, the Levenshtein distance is an algorithm for determining only the constant number of times regardless of the kind and object of an edit command. That is, generally, the Levenshtein distance applies the same value or cost (e.g., '1') to each operation for inserting, deleting, and replacing (correcting) the character string. Unlike this, when obtaining the edit distance, the controller 15 applies a cost that is different according to the keypad type to each operation for inserting, deleting, and replacing, because in an incorrect input, the type of frequency of occurrence may be different by keypad type as mentioned above. It is determined that, the less the calculated edit distance, the more the two character strings may be similar with each other. Accordingly, if the edit distance is less, a similarity between a key input string ($s[1 \ldots i]$) of an input character string and a key input string ($t[1 \ldots j]$) of each searched candidate word is generally high. This is described below in detail.

Figure 6:
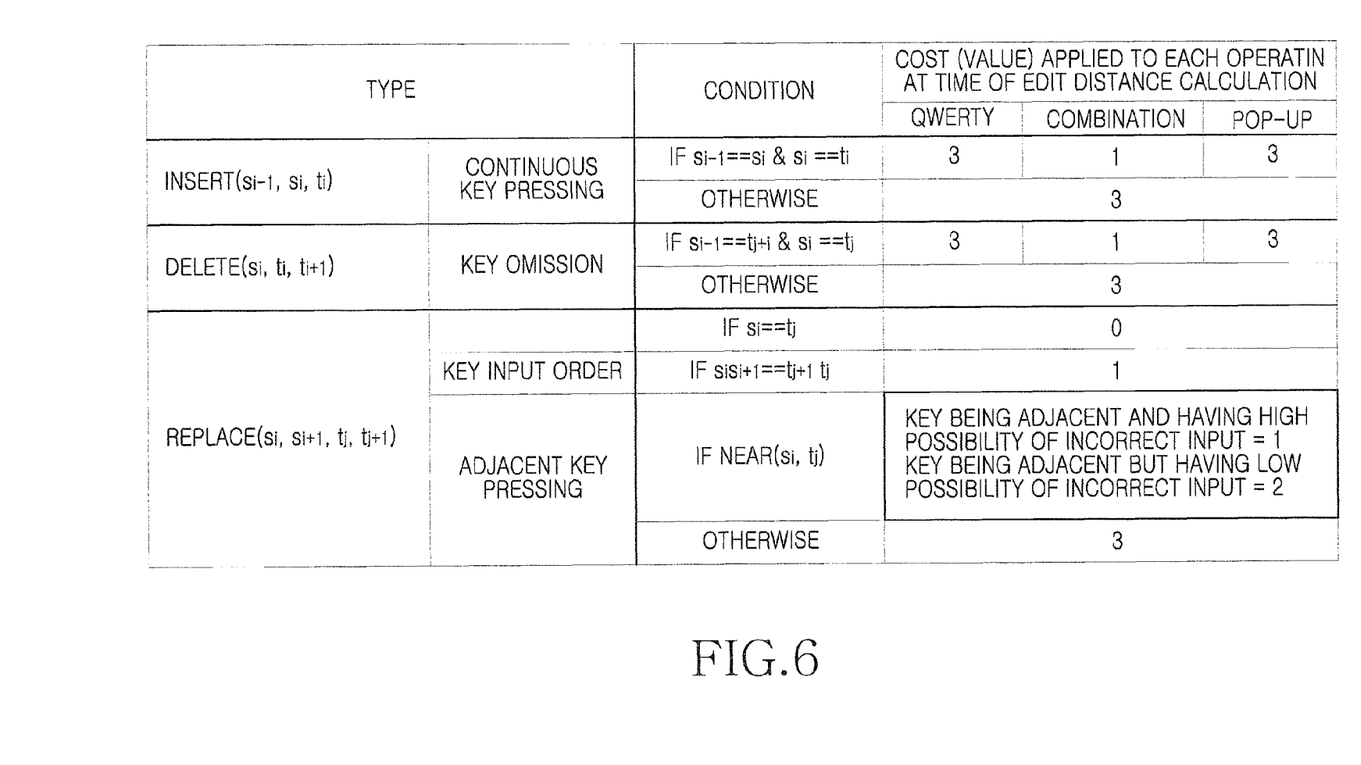
FIG. 6 illustrates an example chart illustrating several costs that may be applied to each operation at the time of edit distance calculation according to an embodiment of the present invention.

FIG. 6 illustrates an example chart depicting several costs that may be applied to each operation at the time of edit distance calculation according to an embodiment of the present invention. Referring to FIG. 6, basically, most operations apply a cost of '3', however, costs for inserting, deleting, and replacing operations are graded considering an incorrect input type of the frequency of occurrence according to the keypad type. For example, incorrect input due to continuous key pressing is difficult to occur in a Qwerty keypad or a pop-up keypad but is relatively more apt to occur in a combination keypad, so that an insert operation of the combination keypad applies a cost of '1' or '3' and the remaining keypad types apply a cost of '3'. That is, if the condition ($s_{i-1}=s_i$ & $s_i=t_j$) of the incorrect input following the continuous key press occurrence is met, the combination keypad applies a cost of '1' to the insert operation and, otherwise, it applies a cost of '3'. The remaining keypad types apply a cost of '3' to the insert operation irrespective of satisfaction or non-satisfaction of the condition ($s_{i-1}=s_i$ & $s_i=t_j$) to the incorrect input following the continuous key press. Also, incorrect input following key omission is difficult to occur in the Qwerty keypad and pop-up keypad but may be relatively more apt to occur in the combination keypad, such that a delete operation of the combination keypad applies a cost of '1' or '3' and the remaining keypad types apply a cost of '3'. That is, if the condition ($s_i=t_{j+1}$ & $s_j=t_j$) of the incorrect input due to the key omission is met, the combination keypad applies a cost of '1' to the delete operation and, otherwise, it applies a cost of '3'. The remaining keypad types apply a cost of '3' to the delete operation irrespective of satisfaction or non-satisfaction of the condition ($s_i s_{i+1}=t_{j+1}t_j$) of the incorrect input due to the key omission. Further, incorrect input following key input order is apt to occur in all keypad types, such that replace operations of the all keypad types apply a cost of '1' or '3', That is, if the condition ($s_i s_{i+1}=t_{j+1}t_j$) of the incorrect input due to the key input order is met, then all keypad types apply a cost of '1' of the replace operation and, otherwise, they apply a cost of '3'. Further, incorrect input due to adjacent key pressing occurs in all keypad types, such that a replace operation applies a corresponding cost by each keypad type considering a physical position of a key. This is described in detail below.

Figure 7:
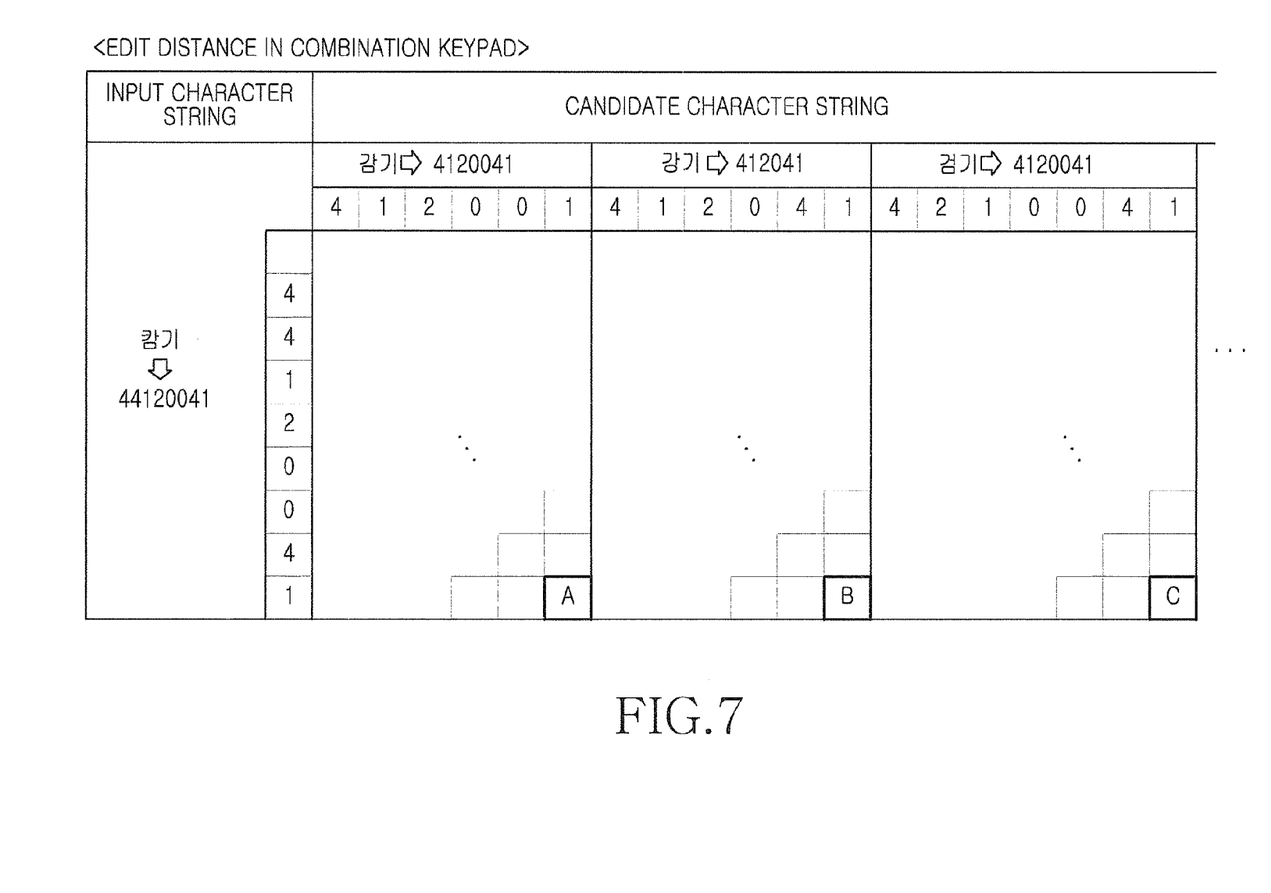
FIG. 7 illustrates an example procedure of obtaining an edit distance between an input character string and each candidate word in a combination keypad according to an embodiment of the present invention.

FIG. 7 illustrates an example procedure of obtaining an edit distance between an input character string and each candidate word in a combination keypad according to an embodiment of the present invention.

Referring to FIG. 7, an input character string inputted by a user and each candidate word corresponding to the input character string are converted into key input strings of the combination keypad. After that, as described above in FIGS. 5 and 6, an edit distance between the two key input strings is determined in the combination keypad. At this time, a cost applied to an insert, delete or replace operation is determined considering the incorrect input type of high frequency of occurrence. The edit distances (A, B, C, . . . ) between the key input string of the input character string and the key input string of the each candidate word are calculated, and corresponding candidate words are presented in ascending order of edit distance to a user.

Figure 9:
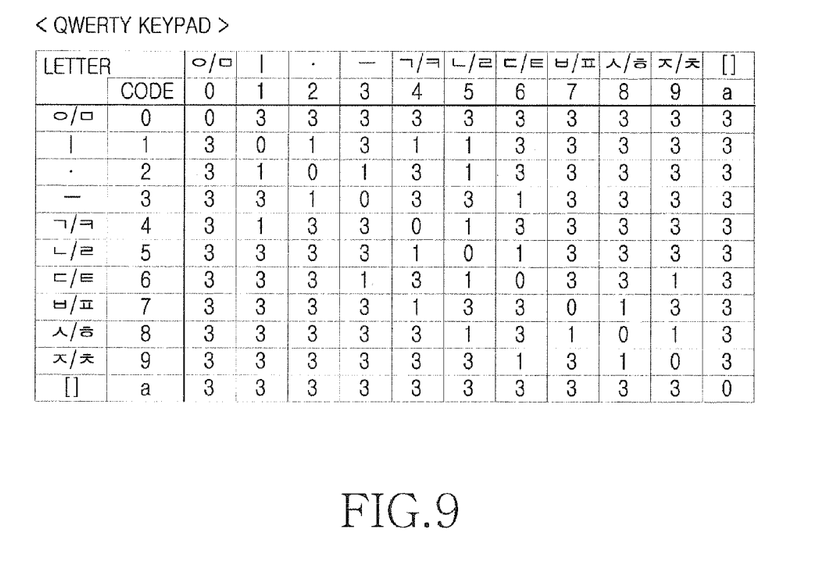
Figure 10:
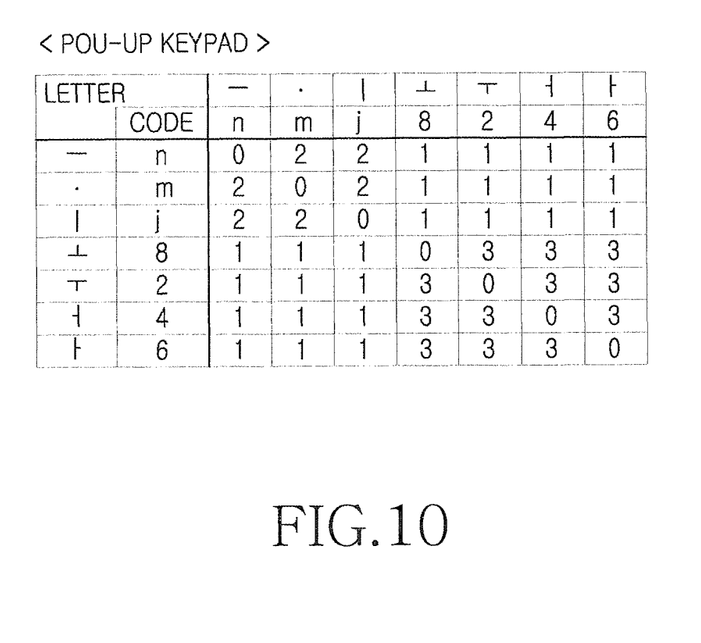

FIGS. 8, 9, and 10 illustrate example charts for presenting a cost applied to replace operation for incorrect input following adjacent key press by each keypad type according to an embodiment of the present invention. Referring to FIGS. 8, 9, and 10, a basic cost is equal to '3', however, a replace operation for the incorrect input following the adjacent key press applies a cost of '1' to a key being adjacent and having high possibility of incorrect input, and applies a cost of '2' to a key being adjacent but having low possibility of incorrect input.

Figure 11:
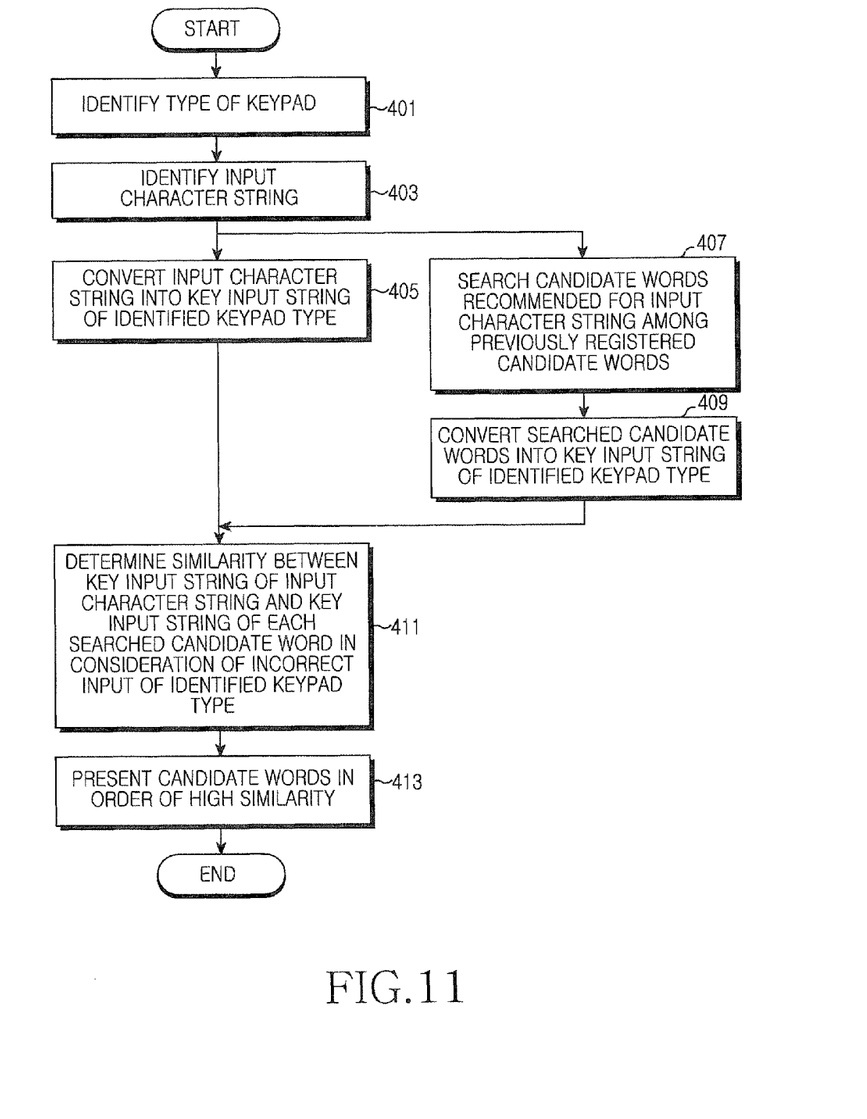
FIG. 11 illustrates an example procedure of presenting a similar word with an input character string according to an embodiment of the present invention.

FIG. 11 illustrates an example procedure of presenting a similar word with an input character string according to an embodiment of the present invention.

Referring to FIG. 11, the controller 15 identifies the type of a keypad (step 401). As mentioned earlier, the keypad type can include a Qwerty keypad, a combination keypad, or a pop-up keypad. For one example, a touch screen can provide all of three keypad types simultaneously, and a user can select and use one of the three keypad types. In other embodiments, the keypad may include a type different from the Qwerty keypad, the combination keypad, or the pop-up keypad.

Next, the controller 15 identifies an input character string input by the user (step 403).

After that, the controller 15 converts the input character string into a key input string of the identified keypad type (step 405). The key input string (or code sequence) represents a sequence in which each key is pressed to input the input character string. This is described in detail above with reference to FIG. 4.

Alternately, the controller 15 searches for candidate words recommended for the input character string, among previously registered candidate words (step 407). A method for searching candidate words recommended for an input character string can analyze the input character string in a letter unit and then, among previously registered candidate words, search candidate words consistent more than a predetermined threshold level with the analyzed input character string. Next, as mentioned earlier, the controller 15 converts the searched candidate words into a key input string of the identified keypad type (step 409).

After that, the controller 15 determines a similarity between a key input string of an input character string and a key input string of each candidate word in consideration of incorrect input of the identified keypad type (step 411). This is described in detail above with reference to FIG. 5.

Next, the controller 15 presents an array of candidate words in order of high similarity with an input character string (step 413).

At this point, the process as described with reference to FIG. 11 is concluded.

Also, computer readable storage medium storing one or more programs, the one or more programs comprising instructions, which when executed by a portable electronic device with a touch-sensitive display, cause the portable electronic device to perform a method comprising, receiving an input character string and, among previously registered candidate words, searching among a plurality of candidate words recommended for the input character string, determining a similarity between the input character string and each of the searched candidate words, and displaying one or more of the searched candidate words according to an order of descending similarity associated with the one or more searched candidate words may be stored as one or more software modules in a storage unit.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In conclusion, embodiments of the present invention present a similar word considering the type of incorrect input by keypad, thereby reducing incorrect input and helping user's input.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for assisting in avoiding incorrect input in a portable terminal, the method comprising:
   identifying an input character string and, among previously registered candidate words, searching among a plurality of candidate words recommended for the input character string;
   calculating a similarity between the input character string and each of the searched candidate words based at least partially upon a type of keypad used to input the input character string, wherein calculating the similarity between the input character string and each of the searched candidate words comprises:
   identifying the keypad type;
   determining each cost of an insert operation, a delete operation, and a replace operation corresponding to the identified keypad type; and
   calculating an edit distance using the operations according to the respective cost of each of the candidate words; and
   providing one or more of the searched candidate words according to the calculated similarity.

2. The method of claim 1, wherein identifying the input character string and searching the candidate words recommended for the input character string further comprises analyzing each letter of the input character string and, among the previously registered candidate words, search candidate words with letters having more than a specified threshold level similar to the analyzed input character string.

3. The method of claim 1, wherein providing one or more of the searched candidate words according to the calculated similarity further comprises providing corresponding candidate words in an ascending order of calculated edit distance.

4. The method of claim 1, wherein calculating the edit distance using the operations according to the respective cost comprises:
   converting the input character string and the searched candidate words into key input strings of the identified keypad type; and
   calculating an edit distance between the key input string of the input character string and the key input string of each of the searched candidate words.

5. The method of claim 4, wherein converting the input character string and the searched candidate words into the key input strings of the identified keypad type comprises:
   identifying a code assigned to each key of the identified keypad type; and
   selecting, as a code sequence, each key in a series of order to input the input character string and the candidate words.

6. The method of claim 4, wherein determining the each cost of the insert operation, delete operation, and replace operation corresponding to the identified keypad type comprises:
   identifying at least one or more incorrect input types having a high frequency of occurrence associated with the identified keypad type;
   if operating conditions of at least one or more incorrect input types having a high frequency of occurrence are met, determining the cost of the insert operation, the delete operation, or the replace operation as a first value and, otherwise, determining the cost of the insert operation, the delete operation, or the replace operation as a second value higher than the first value; and
   determining the cost of the insert operation, the delete operation, or the replace operation as a basic cost whether the operating conditions are met or not.

7. The method of claim 6, wherein the incorrect input type comprises any one of an incorrect input due to a continuous key press, an incorrect input due to an adjacent key press, an incorrect input due to a key omission, and an incorrect input due to a key input order.

8. The method of claim 7, wherein, if the operating conditions of the at least one or more incorrect input types having the high frequency of occurrence are met, determining the cost of the insert operation, the delete operation, or the replace operation as the first value and otherwise, determining the cost of the insert operation, the delete operation, or the replace operation as the second value higher than the first value,     if the operating condition of the incorrect input following the continuous key pressing is met, applying the cost of the insert operation as '1' and otherwise, applying the cost of the insert operation as '3',     if the operation condition of the incorrect input due to the key omission is met, applying the cost of the delete operation as '1' and otherwise, applying the cost of the delete operation as '3',     if the operation condition of the incorrect input due to the key input order is met, applying the cost of the replace operation as '1' and otherwise, applying the cost of the replace operation as '3', or     if the operation condition of the incorrect input due to the adjacent key pressing is met and the possibility of incorrect input is high, applying the cost as '1' and, if the possibility of incorrect input as low, applying the cost as '2' and otherwise, applying the cost of '3'.

9. The method of claim 8, wherein the keypad type comprises at least any one of a Qwerty keypad, a combination keypad, and a pop-up keypad.

10. The method of claim 9, wherein the Qwerty keypad has the high frequency of occurrence of the incorrect input due to the adjacent key press and the incorrect input due to the key input order,     wherein the combination keypad has the high frequency of occurrence of the incorrect input due to the continuous key press, the incorrect input due to the adjacent key press, the incorrect input due to the key omission, and the incorrect input due to the key input order, and     wherein the pop-up keypad has the high frequency of occurrence of the incorrect input due to the adjacent key press and the incorrect input due to the key input order.

11. The method of claim 8, further comprising calculating an edit distance between a key input string (s[1 . . . i]) of the input character string and a key input string (t[1 . . . j]) of each of the searched candidate words,     wherein the operating condition of the incorrect input following the continuous key press is equal to $s_{i-1}=s_i$ & $s_i=t_j$, the operating condition of the incorrect input following the key omission is equal to $s_i=t_{j+1}$ & $s_i=t_j$, and the operating condition of the incorrect input following the key input order is equal to $s_i s_{i+1}=t_{j+1} t_j$.

12. An apparatus configured to assist in avoiding incorrect input in a portable terminal, the apparatus comprising:

an input unit configured to receive a user input;

a storage unit configured to store data; and a controller configured to, after identifying an input character string from the user input, search a plurality of candidate words recommended for the input character string from among one or more previously registered candidate words, calculate a similarity between the input character string and each of the searched candidate words based at least partially upon a type of keypad used to input the input character string, and display, via a display, one or more of the searched candidate words according to the calculated similarity,     wherein the controller is configured to calculate the similarity between the input character string and each of the searched candidate words by identifying the keypad type; determining each cost of an insert operation, a delete operation, and a replace operation correspondingly to the identified keypad type; and calculating an edit distance using the operations according to the respective cost associated with each operation.

13. The apparatus of claim 12, wherein the controller is configured to, after identifying the input character string, search the candidate words recommended for the input character string, analyze each letter of the input character string and, among the one or more previously registered candidate words, and search candidate words with letters having more than a predetermined threshold similar to the analyzed input character string.

14. The apparatus of claim 12, wherein the controller is configured to present the candidate words in order of high similarity by presenting corresponding candidate words in ascending order of calculated edit distance.

15. The apparatus of claim 12, wherein, the controller is configured to calculate the edit distance using the operations according to the respective cost by converting the input character string and the searched candidate words into key input strings of the identified keypad type and calculate an edit distance between the key input string of the input character string and the key input string of each of the searched candidate words.

16. The apparatus of claim 15, wherein the controller is configured to convert the input character string and the searched candidate words into the key input strings of the identified keypad type by identifying a code given to each key of the identified keypad type, and convert each key in a series of order into a code sequence so as to input the input character string and the candidate words.

17. The apparatus of claim 15, wherein the controller is configured to:

determine the cost of the insert operation, delete operation, and replace operation corresponding to the identified keypad type by identifying at least one or more incorrect input types of high frequency of occurrence in the identified keypad type and, if operating conditions of at least one or more incorrect input types having the high frequency of occurrence are met, determining the cost of the insert operation, the delete operation or the replace operation as a first value and otherwise, determine the cost of the insert operation, the delete operation or the replace operation as a second value higher than the first value, and     determine the cost of the insert operation, the delete operation or the replace operation as a basic cost whether the operating conditions are met or not.

18. The apparatus of claim 17, wherein the incorrect input type comprises any one of an incorrect input due to a continuous key press, an incorrect input due to an adjacent key press, an incorrect input due to a key omission, and an incorrect input due to key input order.

19. The apparatus of claim 18, wherein, the controller is configured to:

if the operating conditions of the at least one or more incorrect input types having the high frequency of occurrence are met, determine the cost of the insert operation, the delete operation or the replace operation as the first value and otherwise, determine the cost of the insert operation, the delete operation or the replace operation as the second value higher than the first value,     if the operation condition of the incorrect input following the continuous key pressing is met, the controller is configured to apply the cost of the insert operation as '1' and otherwise, apply the cost of the insert operation as '3',     if the operation condition of the incorrect input following the key omission is met, the controller applies the cost of the delete operation as '1' and otherwise, applies '3', if the operation condition of the incorrect input following the key input order is met, the controller is configured to apply the cost of the replace operation as '1' and otherwise, apply the cost of the replace operation as '3', or if the operation condition of the incorrect input following the adjacent key pressing is met and the possibility of incorrect input is high, the controller applies '1' and, if the possibility of incorrect input is low, applies the cost as '2' and otherwise, apply the cost as '3'.

20. The apparatus of claim 19, wherein the keypad type comprises at least any one of a Qwerty keypad, a combination keypad, and a pop-up keypad.

21. The apparatus of claim 20, wherein the Qwerty keypad has the high frequency of occurrence of the incorrect input due to the adjacent key press and the incorrect input due to the key input order, wherein the combination keypad has the high frequency of occurrence of the incorrect input due to the continuous key press, the incorrect input due to the adjacent key press, the incorrect input due to the key omission, and the incorrect input due to the key input order, and wherein the pop-up keypad has the high frequency of occurrence of the incorrect input due to the adjacent key press and the incorrect input due to the key input order.

22. The apparatus of claim 19, wherein the controller is configured to calculate an edit distance between a key input string ($s[1 \ldots i]$) of the input character string and a key input string ($t[1 \ldots j]$) of each of the searched candidate words, wherein the operating condition of the incorrect input following the continuous key press is equal to $s_{i-1}=s_i$ & $s_i=t_j$, the operating condition of the incorrect input due to the key omission is equal to $s_i=t_{j+1}$ & $s_i=t_j$, and the operating condition of the incorrect input due to the key input order is equal to $s_i s_{i+1}=t_{j+1} t_j$.

23. A portable terminal for assisting in avoiding input, the portable terminal comprising:
a storage unit;
a controller;
one or more modules stored in the storage unit and configured to be executed by a processor, the one or more modules including instructions for:
receiving an input character string and, among previously registered candidate words, searching among a plurality of candidate words recommended for the input character string;
determining a similarity between the input character string and each of the searched candidate words based at least partially upon a type of keypad used to input the input character string; and
displaying one or more of the searched candidate words according to the determined similarity,
wherein the instructions for determining the similarity between the input character string and each of the searched candidate words comprise instructions for:
identifying the keypad type;
determining each cost of an insert operation, a delete operation, and a replace operation corresponding to the identified keypad type; and
calculating an edit distance using the operations according to the respective cost of each of the candidate words.

24. A non-transitory computer readable storage medium storing one or more programs, the one or more programs comprising instructions, which when executed by a portable electronic device with a touch-sensitive display, cause the portable electronic device to perform a method comprising:
receiving an input character string and, among previously registered candidate words, searching among a plurality of candidate words recommended for the input character string;
determining a similarity between the input character string and each of the searched candidate words based at least partially upon a type of keypad used to input the input character string; and
displaying one or more of the searched candidate words according to an order of descending similarity associated with the one or more searched candidate words,
wherein the instructions that, when executed by the portable electronic device, cause the portable electronic device to perform determining the similarity between the input character string and each of the searched candidate words comprise instructions that, when executed by the portable electronic device, cause the portable electronic device to perform:
identifying the keypad type;
determining each cost of an insert operation, a delete operation, and a replace operation corresponding to the identified keypad type; and
calculating an edit distance using the operations according to the respective cost of each of the candidate words.

* * * * *